April 17, 1962 G. D. REHKLAU 3,030,045

TAPE REEL

Filed Nov. 22, 1957

INVENTOR.
George D. Rehklau
BY Flehr and Swain
ATTORNEYS

United States Patent Office 3,030,045

Patented Apr. 17, 1962

3,030,045

TAPE REEL

George D. Rehklau, Menlo Park, Calif., assignor to Ampex Corporation, Redwood City, Calif., a corporation of California Filed Nov. 22, 1957, Ser. No. 698,257

2 Claims. (Cl. 242—74)

This invention relates generally to the construction of members for storing pliable tapes of plastic material, such as tapes of the type used in connection with magnetic recording, photographic film strips and the like.

In connection with the winding of pliable tapes or strips on reels, a wide variety of expedients have been used for retention of the end of the tape on the reel hub, while the first wrap of the tape is being made. Such expedients have included mechanical devices by means of which the end of the tape is attached to the hub, and pressure sensitive adhesives by means of which the end of the tape is adhered to the hub. All of such expedients have some inherent disadvantages. Mechanical devices may require considerable skill, and may cause some mutilation or permanent creasing or bending of the tape. Pressure sensitive adhesives, whether permanently applied to the end of the tape or in the form of a short length of "Scotch" tape, may not readily pass devices through which the tape is fed, such as the driving capstans and magnetic heads of magnetic tape recorders. All of such expedients may not permit the tape readily to free itself from the hub when all of the tape is unwound. In addition to the foregoing many of such expedients are such that they cause some unevenness of the surface upon which the tape is wrapped, with the result that some permanent creasing or irregular bending may occur.

In general it is an object of the present invention to provide a tape reel which will avoid the objectionable features pointed out above.

Another object of the invention is to provide a reel of the type described above which retains the end of the tape without the use of mechanical devices, which permits the tape readily to pull free at the end of an unwinding operation, and which does not cause any distortion of the end of the tape, or of the subsequent convolutions.

Still another object of this invention is to provide a novel plastic tape winding member.

More particularly it is an object of the invention to provide a tape reel having a hub with a special surfacing, the surfacing being of such material that it has molecular attraction for the end of the tape.

Additional objects and features of the invention will appear from the following description in which the preferred embodiment has been set forth in detail in conjunction with the accompanying drawing.

Referring to the drawing.

In accordance with the present invention I provide a tape reel having a hub with a peripheral surface formed of a plastic material. This material is so selected that it has high molecular attraction for the plastic material of the tape. The end of a length of tape to be wound upon the reel therefore adheres to the hub to effect retention during commencement of a tape winding or reeling operation.

The invention can be incorporated in a wide variety of reels. The particular reel illustrated consists of a hub 10, having a central opening or bore 11, and having the spaced sides 12 to confine the tape. Slots 13 in the hub accommodate keys which may be carried by the turntable or shaft upon which the reel is placed for a winding or unwinding operation. Such a reel may be constructed of various materials, such as lightweight metal, or molded plastic material.

The outer periphery of the hub 10 is provided with a special surfacing 14. This surfacing is preferably provided by taking a strip of pliable plastic material having the desired characteristics, and cementing or adhesively securing it to the hub, whereby it covers substantially the entire peripheral hub surface. The particular plastic used is such that it has high molecular attraction for the plastic material from which the tape is made. Assuming for example that the reel is to be used with magnetic tape consisting of a pliable film of cellulose acetate or a polyester film (polyethylene terephthalate) like "Mylar," the surfacing 14 can be made of plasticized polyvinyl chloride-acetate. Such a plastic film can be readily attached to the periphery of the hub by conventional adhesives, such as one of the pressure sensitive type.

Figure 1:
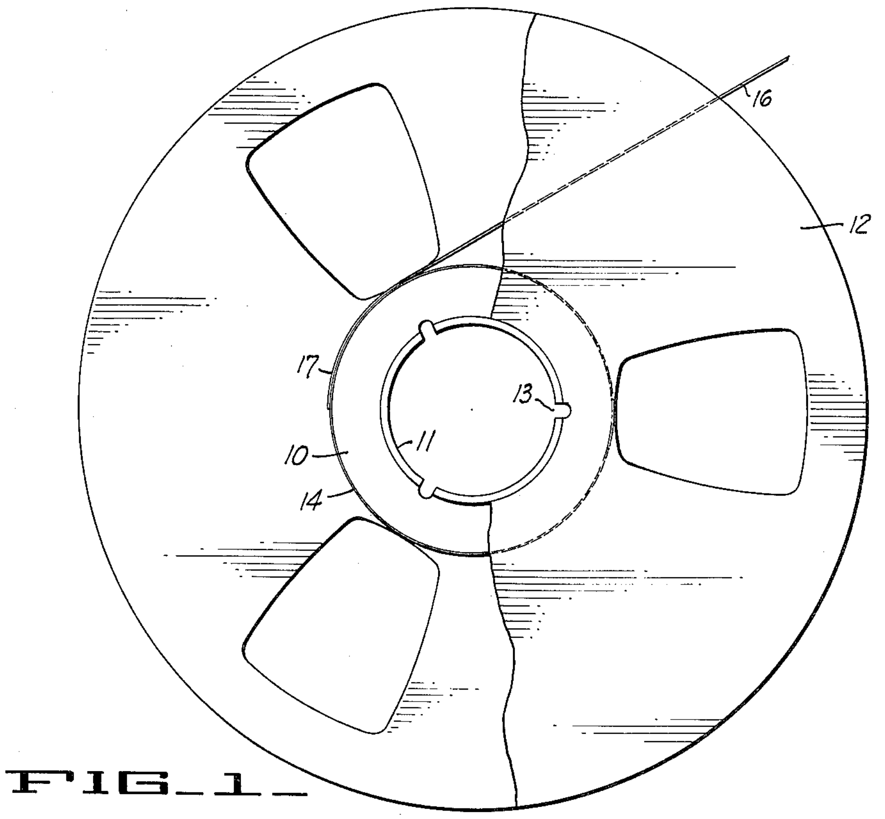
FIGURE 1 is a side elevational view, partly in cross-section, illustrating a reel in accordance with the present invention.
Figure 2:
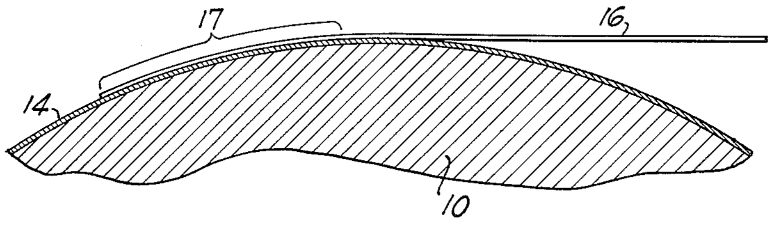
FIGURE 2 is an enlarged detail in section illustrating the construction of the hub, and the manner in which the end of the tape adheres to the same.

In FIGURE 2 I have shown a tape 16 of the type used with magnetic tape recorders and reproducing machines. Such tape is generally reeled with the coated magnetic surface faced inwardly towards the hub. In the manufacture of such a tape a short end length, as for example the portion 17, is left uncoated with the magnetic material. When this portion of the tape is laid upon the surfacing 14, with a slight amount of pressing by the fingers of the operator, it effectively adheres to the surfacing 14 by molecular attraction. This molecular attraction is sufficient to hold the end of the tape stationary with respect to the hub, whereby the first wrap can be made without difficulty. Subsequent wraps apply pressure upon the first, thus insuring against slippage.

Assuming that tape is being unwrapped from the reel, when the last convolution is unwound, the portion 17 readily peals off of the surfacing 14, thus avoiding any jerking action which might cause breakage or mutilation of the tape.

Since the surfacing 14 conforms to the cylindrical shaping of the hub, each convolution is laid down flat without creases or bulging. Therefore no distortions of the tape occur, such as might cause permanent creasing or bending.

In the foregoing it is assumed that molecular attraction takes place between the plastic surfacing of the hub and the material of the tape. When the material of the tape is such that it does not have the desired molecular attraction for the hub surfacing, or where the magnetic or like surfacing does not terminate to leave an uncoated end portion, the tape may be provided with a tape leader of proper material, adhesively secured or otherwise spliced to the end of the tape. Such leader will function in the same manner as described above.

I claim:

1. A reel for storing pliable tapes of the cellulose acetate or polyethylene terephthalate type, comprising a hub having a peripheral surface formed of plasticized polyvinyl chloride-acetate, said polyvinyl chloride-acetate having the characteristic of high molecular attraction for the material forming one end portion of the tape whereby said end of the tape adheres to the hub to effect retention on the hub as winding of the tape proceeds thereon.

2. A reel as in claim 1 in which the plasticized polyvinyl chloride-acetate is in the form of a flexible strip adhesively secured to the periphery of the hub.

References Cited in the file of this patent

UNITED STATES PATENTS

| | | |
|---|---|---|
| 2,536,773 | Saidel | Jan. 2, 1951 |
| 2,578,283 | Bornemann et al. | Dec. 11, 1951 |
| 2,679,969 | Richter | June 1, 1954 |
| 2,732,146 | Napolitani | Jan. 24, 1956 |
| 2,771,756 | Burleson et al. | Nov. 27, 1956 |